US009696808B2

(12) United States Patent
Nishihara et al.

(10) Patent No.: US 9,696,808 B2
(45) Date of Patent: Jul. 4, 2017

(54) HAND-GESTURE RECOGNITION METHOD

(75) Inventors: H. Keith Nishihara, Los Altos, CA (US); Shi-Ping Hsu, Pasadena, CA (US); Adrian Kaehler, Bolder Creek, CA (US); Lars Jangaard, Glendale, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1412 days.

(21) Appl. No.: 12/337,225

(22) Filed: Dec. 17, 2008

(65) Prior Publication Data

US 2009/0103780 A1  Apr. 23, 2009

Related U.S. Application Data

(63) Continuation-in-part of application No. 12/196,767, filed on Aug. 22, 2008, and a continuation-in-part of application No. 11/485,788, filed on Jul. 13, 2006.

(51) Int. Cl.
*G06F 3/01* (2006.01)
*G06F 3/03* (2006.01)
(Continued)

(52) U.S. Cl.
CPC ............ *G06F 3/017* (2013.01); *G06F 3/0304* (2013.01); *G06F 3/0425* (2013.01);
(Continued)

(58) Field of Classification Search
USPC .................................................. 715/702, 863
See application file for complete search history.

(56) References Cited

U.S. PATENT DOCUMENTS

| 4,468,694 A | 8/1984 | Edgar |
| 4,843,568 A | 6/1989 | Krueger et al. |

(Continued)

FOREIGN PATENT DOCUMENTS

| DE | 197 39 285 C1 | 11/1998 |
| EP | 0 571 702 A2 | 12/1993 |

(Continued)

OTHER PUBLICATIONS

Baudel et al. "Charade: remote control of objects using free-hand gestures." Communications of the ACM—Special issue on computer augmented environments: back to the real word. Jul. 1993. vol. 36. p. 28-35.*

(Continued)

*Primary Examiner* — Kieu Vu
*Assistant Examiner* — Blaine Basom
(74) *Attorney, Agent, or Firm* — Tarolli, Sundheim, Covell & Tummino LLP

(57) ABSTRACT

One embodiment of the invention includes a method of providing device inputs. The method includes illuminating hand gestures performed via a bare hand of a user in a foreground of a background surface with at least one infrared (IR) light source. The method also includes generating a first plurality of silhouette images associated with the bare hand based on an IR light contrast between the bare hand and the background surface and generating a second plurality of silhouette images associated with the bare hand based on an IR light contrast between the bare hand and the background surface. The method also includes determining a plurality of three-dimensional features of the bare hand relative to the background surface based on a parallax separation of the bare hand in the first plurality of silhouette images relative to the second plurality of silhouette images. The method also includes determining a provided input (Continued)

gesture based on the plurality of three-dimensional features of the bare hand and comparing the provided input gesture with a plurality of predefined gesture inputs in a gesture library. The method further includes providing at least one device input corresponding to interaction with displayed visual content based on the provided input gesture corresponding to one of the plurality of predefined gesture inputs.

4 Claims, 9 Drawing Sheets

(51) Int. Cl.
  *G06F 3/042* (2006.01)
  *G06F 3/0484* (2013.01)
  *G06F 3/0485* (2013.01)
  *G06K 9/00* (2006.01)

(52) U.S. Cl.
  CPC ........ *G06K 9/00355* (2013.01); *G06F 3/0484* (2013.01); *G06F 3/0485* (2013.01)

(56) References Cited

U.S. PATENT DOCUMENTS

| | | | |
|---|---|---|---|
| 4,924,506 A | 5/1990 | Crossley et al. | |
| 5,220,441 A | 6/1993 | Gerstenberger | |
| 5,239,373 A | 8/1993 | Tang et al. | |
| 5,475,422 A | 12/1995 | Mori et al. | |
| 5,483,261 A | 1/1996 | Yasutake | |
| 5,528,263 A * | 6/1996 | Platzker et al. | 345/156 |
| 5,563,988 A | 10/1996 | Maes et al. | |
| 5,805,167 A * | 9/1998 | van Cruyningen | 715/808 |
| 5,913,727 A | 6/1999 | Ahdoot | |
| 5,999,185 A | 12/1999 | Kato et al. | |
| 6,002,808 A | 12/1999 | Freeman | |
| 6,128,003 A | 10/2000 | Smith et al. | |
| 6,147,678 A | 11/2000 | Kumar et al. | |
| 6,195,104 B1 | 2/2001 | Lyons | |
| 6,204,852 B1 | 3/2001 | Kumar et al. | |
| 6,208,329 B1 * | 3/2001 | Ballare | 345/173 |
| 6,222,465 B1 | 4/2001 | Kumar et al. | |
| 6,313,853 B1 * | 11/2001 | Lamontagne et al. | 715/762 |
| 6,327,381 B1 | 12/2001 | Rogina et al. | |
| 6,353,428 B1 | 3/2002 | Maggioni et al. | |
| 6,359,612 B1 | 3/2002 | Peter et al. | |
| 6,385,331 B2 * | 5/2002 | Harakawa et al. | 382/106 |
| 6,434,255 B1 | 8/2002 | Harakawa | |
| 6,512,507 B1 | 1/2003 | Furihata et al. | |
| 6,624,833 B1 | 9/2003 | Kumar et al. | |
| 6,681,031 B2 | 1/2004 | Cohen et al. | |
| 6,695,770 B1 | 2/2004 | Choy et al. | |
| 6,714,901 B1 | 3/2004 | Cotin et al. | |
| 6,720,949 B1 | 4/2004 | Pryor et al. | |
| 6,788,809 B1 | 9/2004 | Grzeszczuk et al. | |
| 6,796,656 B1 | 9/2004 | Dadourian | |
| 6,806,849 B2 | 10/2004 | Sullivan | |
| 6,857,746 B2 | 2/2005 | Dyner | |
| 6,950,534 B2 | 9/2005 | Cohen et al. | |
| 6,956,573 B1 | 10/2005 | Bergen et al. | |
| 6,983,065 B1 | 1/2006 | Akgul et al. | |
| 7,042,440 B2 | 5/2006 | Pryor et al. | |
| 7,129,927 B2 | 10/2006 | Mattsson | |
| 7,259,747 B2 | 8/2007 | Bell | |
| 7,348,963 B2 * | 3/2008 | Bell | 345/156 |
| 7,411,575 B2 * | 8/2008 | Hill et al. | 345/156 |
| 7,598,942 B2 * | 10/2009 | Underkoffler et al. | 345/158 |
| 7,701,439 B2 | 4/2010 | Hillis et al. | |
| 7,956,847 B2 * | 6/2011 | Christie | 345/173 |
| 2001/0006426 A1 | 7/2001 | Son et al. | |
| 2001/0043719 A1 | 11/2001 | Harakawa et al. | |
| 2002/0090146 A1 | 7/2002 | Heger et al. | |
| 2002/0093666 A1 | 7/2002 | Foote et al. | |
| 2002/0122113 A1 | 9/2002 | Foote | |
| 2002/0126161 A1 | 9/2002 | Kuzunuki et al. | |
| 2002/0186221 A1 | 12/2002 | Bell | |
| 2002/0186251 A1 * | 12/2002 | Himmel et al. | 345/784 |
| 2003/0058341 A1 | 3/2003 | Brodsky et al. | |
| 2003/0067537 A1 | 4/2003 | Myers | |
| 2003/0085866 A1 | 5/2003 | Bimber | |
| 2003/0156756 A1 | 8/2003 | Gokturk et al. | |
| 2003/0218751 A1 | 11/2003 | Tomasi et al. | |
| 2004/0046747 A1 | 3/2004 | Bustamante | |
| 2004/0108990 A1 | 6/2004 | Lieberman et al. | |
| 2004/0113885 A1 | 6/2004 | Genc et al. | |
| 2004/0125207 A1 | 7/2004 | Mittal et al. | |
| 2004/0183775 A1 | 9/2004 | Bell | |
| 2004/0193413 A1 * | 9/2004 | Wilson et al. | 704/243 |
| 2004/0239761 A1 | 12/2004 | Jin et al. | |
| 2005/0002074 A1 | 1/2005 | McPheters et al. | |
| 2005/0012817 A1 | 1/2005 | Hampapur et al. | |
| 2005/0052714 A1 | 3/2005 | Klug et al. | |
| 2005/0068537 A1 | 3/2005 | Han et al. | |
| 2005/0088714 A1 | 4/2005 | Kremen | |
| 2005/0110964 A1 | 5/2005 | Bell et al. | |
| 2005/0151850 A1 | 7/2005 | Ahn et al. | |
| 2005/0166163 A1 | 7/2005 | Chang et al. | |
| 2005/0275628 A1 | 12/2005 | Balakrishnan et al. | |
| 2005/0285945 A1 | 12/2005 | Usui et al. | |
| 2005/0286101 A1 | 12/2005 | Garner et al. | |
| 2006/0010400 A1 | 1/2006 | Dehlin et al. | |
| 2006/0026536 A1 * | 2/2006 | Hotelling et al. | 715/863 |
| 2006/0036944 A1 | 2/2006 | Wilson | |
| 2006/0052953 A1 | 3/2006 | Vilanova et al. | |
| 2006/0092178 A1 | 5/2006 | Tanguay | |
| 2006/0125799 A1 | 6/2006 | Hillis et al. | |
| 2006/0187196 A1 | 8/2006 | Underkoffler et al. | |
| 2006/0203363 A1 | 9/2006 | Levy-Rosenthal | |
| 2006/0209021 A1 | 9/2006 | Yoo et al. | |
| 2007/0024590 A1 | 2/2007 | Krepec | |
| 2007/0064092 A1 | 3/2007 | Sandbeg et al. | |
| 2007/0252898 A1 * | 11/2007 | Delean | 348/211.99 |
| 2007/0257891 A1 * | 11/2007 | Esenther et al. | 345/173 |
| 2008/0005703 A1 * | 1/2008 | Radivojevic et al. | 715/863 |
| 2008/0013793 A1 | 1/2008 | Hillis et al. | |
| 2008/0013826 A1 | 1/2008 | Hillis et al. | |
| 2008/0028325 A1 | 1/2008 | Ferren et al. | |
| 2008/0043106 A1 | 2/2008 | Hassapis et al. | |
| 2008/0055247 A1 * | 3/2008 | Boillot | 345/158 |
| 2008/0150913 A1 | 6/2008 | Bell et al. | |
| 2008/0244468 A1 | 10/2008 | Nishihara et al. | |
| 2009/0015791 A1 | 1/2009 | Chang et al. | |
| 2009/0115721 A1 | 5/2009 | Aull et al. | |
| 2009/0116742 A1 | 5/2009 | Nishihara | |
| 2009/0128516 A1 * | 5/2009 | Rimon et al. | 345/174 |
| 2009/0315740 A1 * | 12/2009 | Hildreth et al. | 341/20 |
| 2009/0316952 A1 | 12/2009 | Ferren et al. | |
| 2010/0027843 A1 * | 2/2010 | Wilson | 382/103 |
| 2010/0050133 A1 | 2/2010 | Nishihara et al. | |

FOREIGN PATENT DOCUMENTS

| | | |
|---|---|---|
| EP | 0 571 702 A3 | 12/1993 |
| EP | 0 913 790 A1 | 5/1999 |
| EP | 1 223 537 A2 | 12/2001 |
| EP | 1 689 172 A1 | 8/2006 |
| EP | 1 879 129 A1 | 1/2008 |
| EP | 1 879 130 A2 | 1/2008 |
| EP | 2 056 185 A2 | 5/2009 |
| EP | 2 068 230 A2 | 6/2009 |
| GB | 2460937 A | 12/2009 |
| JP | 62264390 A | 1/1987 |
| JP | 4271423 A | 2/1991 |
| JP | 04031996 A | 2/1992 |
| WO | WO 98/13746 | 4/1998 |
| WO | WO 00/02187 A1 | 1/2000 |
| WO | WO 00/21023 A1 | 4/2000 |
| WO | WO 00/55802 A | 9/2000 |
| WO | WO 03/026299 A1 | 3/2003 |
| WO | WO 2008/001202 A3 | 1/2008 |

(56) References Cited

FOREIGN PATENT DOCUMENTS

OTHER PUBLICATIONS

Ishibuchi et al. "Real Time Hand Gesture Recognition Using 3D Prediction Model." Proceedings of the International Conference on Systems, Man and Cybernetics. Oct. 17-20, 1993. vol. 17. p. 324-328.*
Cutler et al. "Two-Handed Direct Manipulation on the Responsive Workbench." I3D '97 Proceedings of the 1997 symposium on Interactive 3D graphics. ACM. 1997. p. 107-114.*
Segen et al. "GestureVR: Vision-Based 3D Hand Interface for Spatial Interaction." Multimedia '98 Proceedings of the sixth ACM international conference on Multimedia. ACM. 1998. p. 455-464.*
Manresa, et al. "Hand Tracking and Gesture Recognition for Human-Computer Interaction." Electronic Letters on Computer Vision and Image Analysis. Computer Vision Center. 2005. pp. 96-104.*
Bretzner, et al.: "Hand Gesture Recognition Using Multi-Scale Colour Features, Hierarchical Models and Particle Filtering"; Automatic Face and Gesture Recognition, 2002, Proceedings. Fifth IEEE International Conference on, IEEE, Piscataway, NJ, USA, May 20, 2002, pp. 423-428, XP010949393, ISBN: 978-0-7695-1602-8, p. 2.
British Search Report for corresponding GB 0909597.7 completed Sep. 17, 2009.
British Search Report for corresponding GB0910067.8, completed Oct. 15, 2009.
Dubois, et al.: "In Vivo Measurement of Surgical Gestures"; IEEE Transactions on Biochemical Engineering, vol. 49, No. 1, Jan. 2002, pp. 49-54.
EP Search Report for corresponding EP 07 25 2716, completed Jun. 4, 2010, The Hague.
EP Search Report for corresponding EP 07 25 2870 completed Aug. 16, 2010 by Suphi Umut Naci of the Hague.
European Search Report for corresponding EP 07 25 2717 completed Sep. 27, 2007 by Martin Müller of the EPO.
Fiorentino, et al.: "Spacedesign: A Mixed Reality Workspace for Aesthetic Industrial Design"; Mixed and Augmented Reality, 2002. ISMAR 2002. Proceedings. International Symposium on Sep. 30-Oct. 1, 2002, Piscataway, NJ, USA, IEEE, Sep. 30, 2002, pp. 86-318, XP010620945, ISBN: 0-7695-1781-1; Abstract, Figs. 1, 2; p. 86, left-hand col., ¶4; p. 87, left-hand col., ¶4-right-hand col.
German Office Action for corresponding DE 10 2009 034 413.6-53, issued Sep. 29, 2010.
Hartley, et al.: "Multiple View Geometry in Computer Vision, Structure Computation"; Jul. 31, 2000, Multiple View Geometry in Computer Vision, Cambridge University Press, GB, pp. 295-311, XP002521742, ISBN: 9780521623049, pp. 295-311, figures 11.1, 11.2 & 11.7.
Ishibuci, et al.: "Real Time Hand Gesture Recognition Using 3D Prediction Model"; Proceedings of the International Conference on Systems, Man and Cybernetics. Le Touquet, Oct. 17-20, 1993; New York, IEEE, US LNKD-DOI: 10.1109/ICSMC. 1993. 390870, vol. -, Oct. 17, 1993, pp. 324-328, XP010132504, ISBN: 978-0-7803-0911-1, pp. 325; figures 1-4.
Kjeldsen, et al.: "Toward the Use of Gesture in Traditional User Interfaces"; Automatic Face and Gesture Recognition, 1996, Proceedings of the Second International Conference on Killington, VT, USA 14-16 19961014' Los Alamitos, CA, USA, IEEE Comput. Soc., ISBN 978-0-8186-7713-7; whole document.
Korida, K et al: "An Interactive 3D Interface for a Virtual Ceramic Art Work Environment"; Virtual Systems and Multimedia, 1997.

VSMM '97. Proceedings., International Conference on Geneva, Switzerland Sep. 10-12, 1997, Los Alamitos, CA, USA, IEEE Comput. Soc, US, Sep. 10, 1997, pp. 227-234, XP010245649, ISBN: 0-8186-8150-0; Abstract, Figs. 1, 2, 5, 7-11.
Leibe, et al.: "Toward Spontaneous Interaction with the Perceptive Workbench"; IEEE Computer Graphics and Applications; p. 54-65XP-000969594; Nov./Dec. 2000.
Mitchell: "Virtual Mouse"; ip.com Inc, West Henrietta, NY, US, May 1, 1992 ISSN 1533-0001; whole document.
Office Action for corresponding DE 10 2009 025 236.3, issued May 2010.
Pajares, et al.: "Usability Analysis of a Pointing Gesture Interface"; Systems, Man and Cybernetic, 2004 IEEE International Conference on , Oct. 10, 2004, ISBN 978-0-7803-8566-5; see e.g. sections 2.1 and 4.
Pavlovic, et al.: "Visual Interpretation of Hand Gestures for Human-Computer Interaction: A Review"; Jul. 1, 1997, IEEE Transactions on Pattern Analysis and Machine Intelligence, IEEE Service Center, Los Alamitos, CA, US LNKD-DOI: 10.1109/34.598226, pp. 677-695, XP000698168, ISSN: 0162-8828, pp. 14-16, figure 5.
Plesniak, W et al.: "Spatial Interaction with Haptic Holograms"; Multimedia Computing and Systems, 1999, IEEE International Conference on Florence, Italy Jun. 7-11, 1999, Los Alamitos, CA USA, IEEE Comput. Soc. US, vol. 1, Jun. 7, 1999, pp. 413-426, XP010342817 ISBN: 0-7695-0253-9; Abstract, Figs. 7, 8.
Rehg: "visual Analysis of High DOF Articulated Objects with Application to Hand Tracking"; [online] 1995, XP002585209, School of Computer Science Carnegie Mellon University, Retrieved from the internet: URL: http//www.dtoc/,o;/cgi-bin/GetTRDoc?AD=ADA306677&Location=U2&doc=GetRDoc.pdf> [retrieved on May 25, 2010], p. 1, 28, 31.
Sato, Y et al.: "Real-Time Input of 3D Pose and Gestures of a User's Hand and Its Applications for HCI"; Proceedings IEEE 2001 virtual Reality. (VR). Yokohama, Japan, Mar. 13, 2001, pp. 79-86, XP010535487; ISBN: 0-7695-0948-7; Abstract, Figs. 3, 4, 6, 8.
Search Report for corresponding GB 0715481.8, Date of Search: Nov. 27, 2007.
Search Report for corresponding GB 0913330.7; Completed Nov. 3, 2009 by Dr. Russell Maurice.
Sonka, et al.: "Image Processing, Analysis, and Machine Vision Second Edition"; Sep. 30, 1998, Thomson, XP002585208, ISBN: 053495393X, p. v-xii, p. 82-89.
Sutcliffe, et al.: "Presence, Memory and Interaction in Virtual Environments"; International Journal of Human-Computer Studies, 62 (2005), pp. 307-327.
Vámossy, et al.: "Virtual Hand—Hand Gesture Recognition System", SISY 2007, 5th International Symposium on Intelligent Systems and Informatics, Aug. 24-25, 2007, Subolica, Serbia, IEEE, p. 97-102.
Fiorentino, M et al.: "*Spacedesign: A Mixed Reality Workspace for Aesthetic Industrial Design*"; Mixed and Augmented Reality, 2002. ISMAR 2002. Proceedings. International Symposium on Sep. 30-Oct. 1, 2002, Piscataway, NJ, USA, IEEE, Sep. 30, 2002, pp. 86-318, XP010620945, ISBN: 0-7695-1781-1; Abstract, Figs. 1, 2; p. 86, left-hand col., ¶4; p. 87, left-hand col., ¶4-right-hand col.
Nishihara et al: "*Compound Gesture Recognition*", U.S. Appl. No. 12/196,767, filed Aug. 22, 2008.
Ferren et al: "*Gesture Recognition Interface System with a Light-Diffusive Screen*", U.S. Appl. No. 12/143,529, filed Jun. 20, 2008.
DE Office Action for corresponding DE 10 2009 043 798.3, issued Nov. 10, 2010.

* cited by examiner

HAND-GESTURE RECOGNITION METHOD

RELATED APPLICATIONS

This application is a continuation-in-part of U.S. patent application Ser. No. 11/485,788, filed Jul. 13, 2006, and a continuation-in-part of U.S. patent application Ser. No. 12/196,767, filed Aug. 22, 2008. The subject matter of the aforementioned applications is incorporated herein by reference in its entirety.

TECHNICAL FIELD

The present invention relates generally to interface systems, and specifically to a hand-gesture recognition method.

BACKGROUND

As the range of activities accomplished with a computer increases, new and innovative ways to provide an interface with a computer are often developed to complement the changes in computer functionality and packaging. For example, touch sensitive screens can allow a user to provide inputs to a computer without a mouse and/or a keyboard, such that desk area is not needed to operate the computer. Examples of touch sensitive screens include pressure sensitive membranes, beam break techniques with circumferential light sources and sensors, and acoustic ranging techniques. However, these types of computer interfaces can only provide information to the computer regarding the touch event, itself, and thus can be limited in application. In addition, such types of interfaces can be limited in the number of touch events that can be handled over a given amount of time, and can be prone to interpret unintended contacts, such as from a shirt cuff or palm, as touch events. Furthermore, touch sensitive screens can be prohibitively expensive and impractical for very large display sizes, such as those used for presentations.

SUMMARY

One embodiment of the invention includes a method of providing device inputs. The method includes illuminating hand gestures performed via a bare hand of a user in a foreground of a background surface with at least one infrared (IR) light source. The method also includes generating a first plurality of silhouette images associated with the bare hand based on an IR light contrast between the bare hand and the background surface and generating a second plurality of silhouette images associated with the bare hand based on an IR light contrast between the bare hand and the background surface. The method also includes determining a plurality of three-dimensional features of the bare hand relative to the background surface based on a parallax separation of the bare hand in the first plurality of silhouette images relative to the second plurality of silhouette images. The method also includes determining a provided input gesture based on the plurality of three-dimensional features of the bare hand and comparing the provided input gesture with a plurality of predefined gesture inputs in a gesture library. The method further includes providing at least one device input corresponding to interaction with displayed visual content based on the provided input gesture corresponding to one of the plurality of predefined gesture inputs.

DETAILED DESCRIPTION

Figure 1:
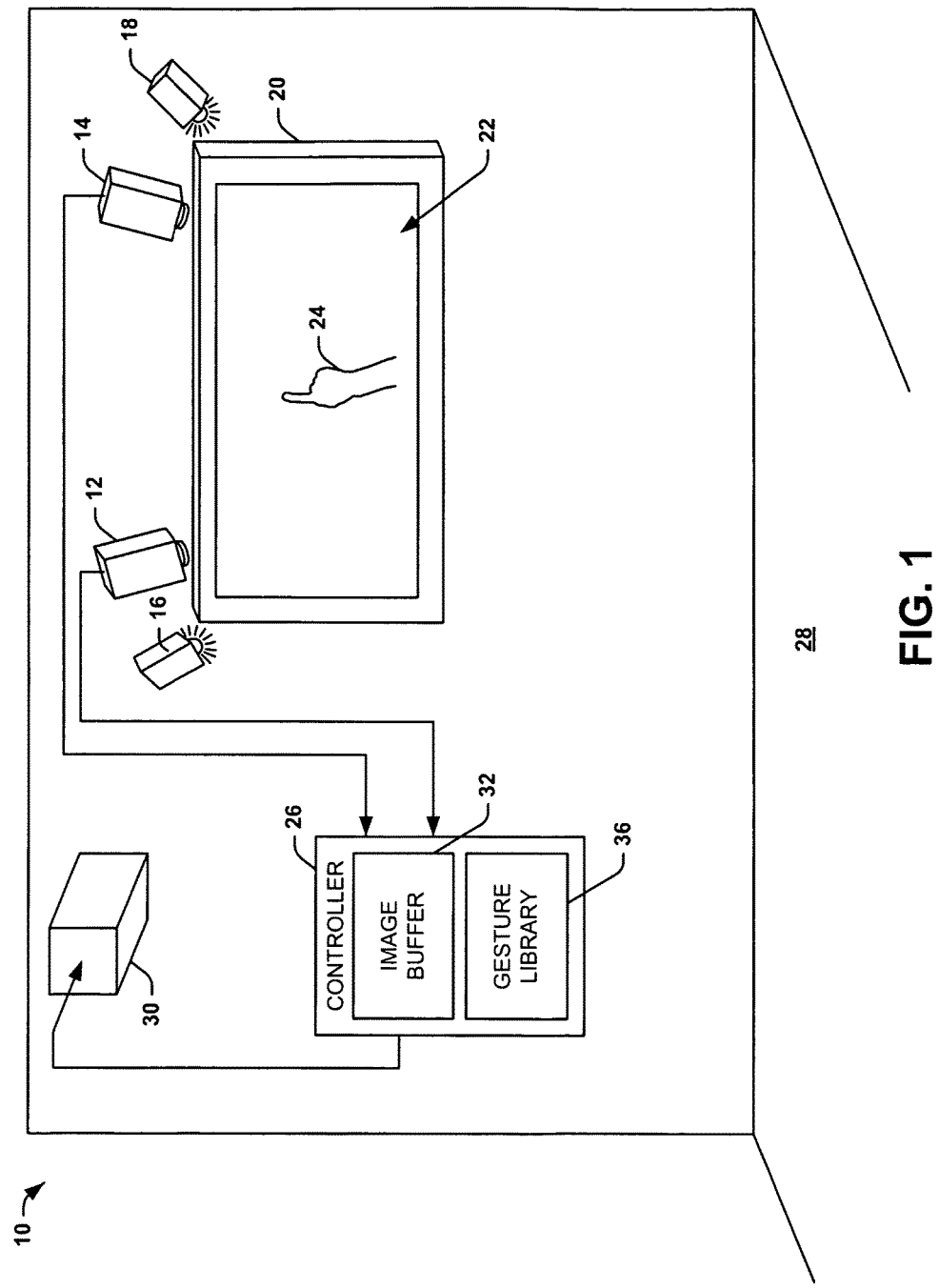
FIG. 1 illustrates an example of a gesture recognition interface system in accordance with an aspect of the invention.

The present invention relates generally to interface systems, and specifically to a hand-gesture recognition method. A user employs a one or more digits of his or her bare hand to provide simulated inputs to a computer or other electronic device. The bare hand can be a user's hand that is unadorned by a special glove or sensors that allow gesture recognition. It is to be understood that as described herein, a digit can include a finger or a thumb. It is also to be understood that the simulated inputs can be provided by simple gestures and/or compound gestures using one or two bare hands. For example, the user could provide gestures that include predefined motion using the bare hand in a gesture recognition environment, such as defined by a foreground of a display screen that displays visual content. The simulated inputs could be, for example, any of a variety of inputs that provide interaction with portions of the visual content.

Any of a variety of gesture recognition interface systems can be implemented to recognize the compound gestures. As an example, one or more infrared (IR) light sources can illuminate a gesture recognition environment that is defined by the area of physical space in a foreground of a vertical or horizontal display surface. The IR light sources can illuminate the gesture recognition environment from above, or can be located beneath an IR-diffusive screen to illuminate a gesture recognition environment that is above the screen from beneath. A set of stereo cameras can each generate a plurality of images of the bare hand. The plurality of images can be, for example, based on a reflected light contrast of the IR light reflected back from the bare hand relative to substantially non-reflected light, based on a more highly reflected light from a retroreflective background surface, or from the IR light being illuminated from beneath an IR diffusive screen. The plurality of images of the bare hand from each camera could be, for example, a plurality of matched sets of images of the bare hand, such that each image in the matched set of images corresponds to the bare hand from a different perspective at substantially the same time. A given matched set of images can be employed to determine a location of the bare hand and the plurality of matched sets of images can be employed to determine physical motion of the bare hand.

A controller can be configured to receive the plurality of images to determine three-dimensional location and feature information associated with the bare hand relative to the background surface. For example, the controller could apply an algorithm to determine features of the bare hand, such as extension, bending, and orientation of fingers in three-dimensional space. The controller could then translate the simulated inputs into device inputs based on the three-dimensional location and feature information. For example, the controller could interpret gesture inputs based on motion associated with the bare hand and translate the gesture inputs into inputs to a computer or other device. The controller could also compare the motion associated with the one or more endpoints of the fingers and/or thumb of the bare hand with a plurality of predefined gestures stored in a gesture library, such that a match with a given predefined gesture could correspond to a particular device input.

FIG. 1 illustrates an example of a gesture recognition interface system 10 in accordance with an aspect of the invention. The gesture recognition interface system 10 includes a first camera 12, a second camera 14, a first IR light source 16, and a second IR light source 18 mounted above a vertical display surface 20. As an example, the vertical display surface 20 can be a projection screen. The first camera 12 and the second camera 14 may each include an IR filter, such that the respective camera may only be able to receive IR light. The first IR light source 16 and the second IR light source 18 each illuminate a gesture recognition environment 22 that is defined as the three-dimensional physical space in the foreground of the vertical display surface 20 that is visible by the first and second cameras 12 and 14.

A user's hand 24 can provide simulated inputs in the foreground of the vertical display surface 20. The first camera 12 and the second camera 14 each receive separate images of the user's hand 24, where each of the separate images received, respectively, by the first camera 12 and the second camera 14 are a matched set (i.e., matched pair). As an example, each of the first camera 12 and the second camera 14 could rapidly take still photograph images at, for example, sixty times per second, such that each still photograph image taken by the first camera 12 is matched to a still photograph image taken by the second camera 14 at substantially the same time. The user's hand 24 can appear to be in a different location in each image of the matched set captured by each of the first camera 12 and the second camera 14, respectively, due to parallax caused by the different mounted locations of each of the first camera 12 and the second camera 14. In the example of FIG. 1, the first and second cameras 12 and 14 can each be positioned as angled toward the center of the vertical display surface 20, such as to provide for more accurate position determination of the user's hand 24.

In the example of FIG. 1, the images received by each of the first and second cameras 12 and 14 can be based on IR light that is reflected from the bare hand relative to substantially non-reflected light in the gesture recognition environment 22. Specifically, an object is illuminated at a relative brightness intensity that is $1/D^2$, where D is the distance from the light source. Thus, an object that is twice as far away as another appears four times dimmer. Accordingly, although some of the IR light emitted from the first and second IR light sources 16 and 18 may be reflected from the floor 28 beneath the vertical display surface 20, the intensity of the reflected light may be significantly less than that reflected from the user's hand 24.

The first camera 12 and the second camera 14 can each provide their respective separate images of the user's hand 24 to a controller 26. The controller 26 could reside, for example, within a computer (not shown) for which the gesture recognition interface system 10 is designed to provide a gesture recognition interface. It is to be understood, however, that the hosting of a controller is not limited to a standalone computer, but could be included in embedded processors. The controller 26 can process the respective images associated with the user's hand 24 to generate three-dimensional feature data associated with the user's hand 24.

For example, each of the first camera 12 and the second camera 14 could each be mounted at predetermined angles relative to the floor 28 beneath the vertical display surface 20. For a given matched pair of images of the user's hand 24, if the predetermined angles of each of the cameras 12 and 14 are equal, then each point of the user's hand 24 in two-dimensional space in a given image from the camera 12 is equidistant from a corresponding point of the user's hand 24 in the respective matched image from the camera 14. As such, the controller 26 could determine the three-dimensional physical location of the user's hand 24 based on a relative parallax separation of the matched set of images of the user's hand 24 at a given time. In addition, using a computer algorithm, the controller 26 could also determine the three-dimensional physical location of features associated with portions of the user's hand 24, such as fingers and fingertips. As an example, the controller 26 can be configured to determine and interpret the gestures that are provided in the gesture recognition environment in any of a variety of ways, such as those described in either of U.S. patent applications entitled "Gesture Recognition Interface System", Ser. No. 11/485,788, filed Jul. 13, 2006, and "Gesture Recognition Interface System with Vertical Display", Ser. No. 12/133,836, filed Jun. 5, 2008, each assigned to the same assignee as the Present Application and incorporated herein by reference in its entirety.

The gesture recognition interface system 10 can also include a projector 30. The projector 30 can provide visual content with which the user can interact and provide inputs. In the example of FIG. 1, the projector 30 can project the visual content onto the vertical display surface 20. Because the IR light sources 16 and 18 do not illuminate visible light, the IR illumination may not interfere with the visual content projected from the projector 30. The user can thus employ the user's hand 24 in the gesture recognition environment 22 to simulate inputs in an interactive manner with the visual content.

As an example, the controller 26 can determine gesture inputs that are performed by a user using the user's hand 24 and can translate the gesture inputs into any of a variety of device inputs. For example, the controller 26 could interpret pointing at the vertical display surface 20 by the user's hand 24, such as with an extended index finger or a flat, open hand, to establish a reference on the visual content that is displayed on the vertical display surface 20. As another example, selected data can be manipulated in response to the gesture inputs, such as selecting objects, moving objects, scrolling visual data, turning pages in a document, and any of a variety of other device inputs. Additional gesture inputs can be sequentially implemented using the user's hand 24, or sequential device inputs can be implemented using the user's other hand (not shown). Accordingly, a user of the gesture recognition interface system 10 could navigate through a number of computer menus, graphical user interface (GUI) icons, and/or execute programs associated with a computer merely by moving his or her bare hand through the air in the gesture recognition environment 22 and initiating gesture inputs without touching a mouse, keyboard, or any other computer input device.

In the example of FIG. 1, the controller 26 includes an image buffer 32 that is configured to store the sequentially obtained images from each of the first and second cameras 12 and 14. As an example, the image buffer 32 can be a memory that is configured as a queue, such that new images that are obtained by the first and second cameras 12 and 14 are provided to the image buffer 32 to overwrite the oldest images that are stored therein. The sequential images that are stored in the image buffer 32 can be used by the controller 26 to translate the gestures that are performed in the gesture recognition environment 22 into the device inputs. For example, the controller 26 can be configured to analyze the sequential images that are stored in the image buffer 32 to ascertain three-dimensional motion associated with features of the user's hand 24. The controller 26 can thus compare the three-dimensional motion with predefined gestures that are stored in a predefined gesture library 34 and provide the corresponding device input in response to determining a match. Accordingly, the controller 26 can determine the appropriate device inputs based on the performance of the corresponding gestures.

It is to be understood that the gesture recognition interface system 10 is not intended to be limited to the example of FIG. 1. As an example, the gesture inputs that are implemented in the gesture recognition interface system 10 are not limited to three-dimensional gestures, but could incorporate two-dimensional gestures instead of or in addition to three-dimensional gestures. Furthermore, the gesture recognition interface system 10 need not include a display surface, but that other types of displays, such as holographic and/or non-planar displays, can be implemented. Accordingly, the gesture recognition interface system 10 can be configured in any of a variety of ways.

Figure 2:
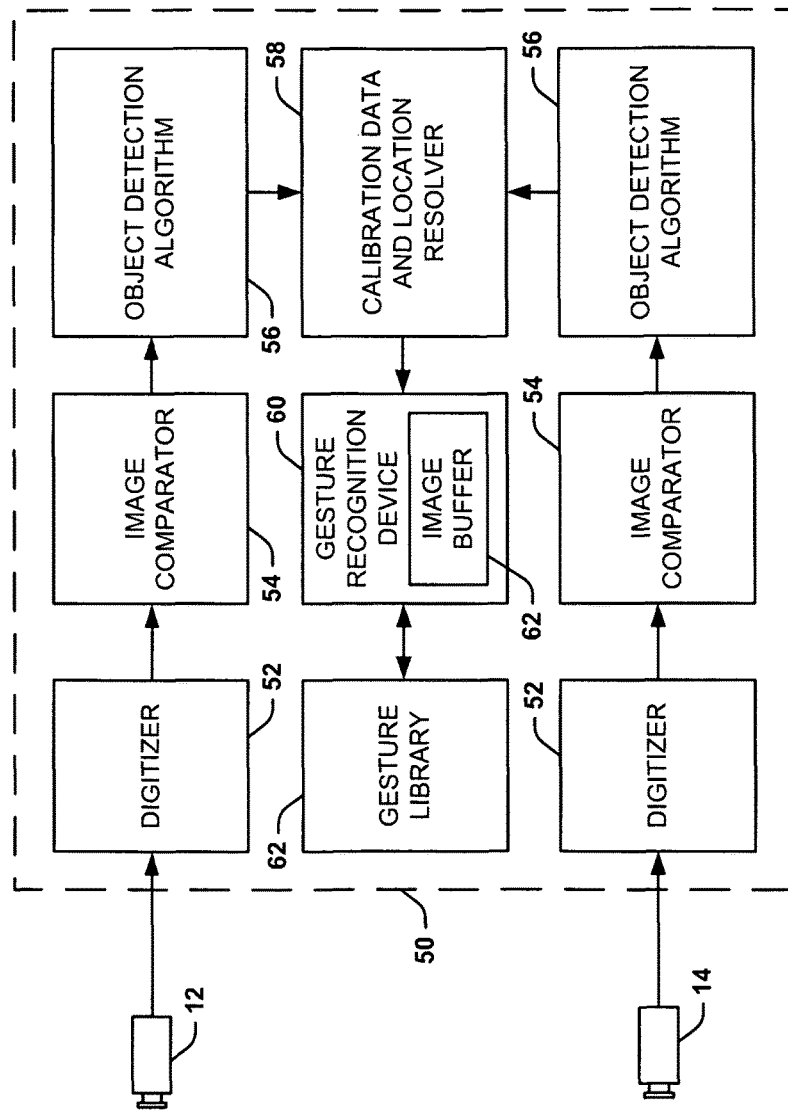
FIG. 2 illustrates an example of a gesture recognition interface controller in accordance with an aspect of the invention.

FIG. 2 illustrates another example of a gesture recognition interface controller 50 in accordance with an aspect of the invention. The gesture recognition interface controller 50 can be a portion of the gesture recognition interface system 10 in the example of FIG. 1. For example, the gesture recognition interface controller 50 can be configured as the controller 26 in the example of FIG. 1. As such, reference is to be made to the example of FIG. 1 in the following discussion of the example of FIG. 2.

The gesture recognition interface controller 50 receives a plurality of images from each of the first camera 12 and the second camera 14. The first and second cameras 12 and 14 each receive a plurality of images of the user's hand 24. The respective images of the user's hand 24 could be silhouette images that are based on a brightness contrast between the user's hand 24 and a background surface. For example, the brightness contrast can be based on the user's hand 24 being substantially bright based on reflecting IR illumination in the foreground of a substantially dark background surface, such as the floor 28. However, as described in greater detail below with regard to the examples of FIG. 3, the brightness contrast can also be based on the user's hand 24 being substantially dark in the foreground of bright IR illumination that is reflected from a horizontal background surface, or in the foreground of bright IR illumination that is diffused through the background surface.

The first and second cameras 12 and 14 each input their respective images of a matched pair of images into a digitizer 52. The digitizer 52 produces digitized versions of the images of the user's hand 24. The digitized images of the user's hand 24 are input to an image comparator 54. The image comparator 54 compares each of the digitized images of the user's hand 24 to a previously stored digitized image of the user's hand 24 to generate a binarized image of the user's hand 24. As an example, although the vertical display surface 20 emits the IR illumination in a substantially more uniform manner, there may still be illumination intensity gradients across the vertical display surface 20. Therefore, the comparison by the image comparator 54 allows for an improved quality of the digitized images despite variations in illumination intensity across the vertical display surface 20. As an example, the previously stored digitized image could have been captured during a calibration operation and/or from repeatedly storing the digitized image in memory buffers.

As an example, a background model can be maintained for each of the cameras 12 and 14 without the user's hand 24 being present. The background model images can be used to decide at each pixel whether the images of the user's hand 24 correspond to a binary 1 or 0. For example, at each pixel location, if the image of the user's hand 24 has a value that is approximately greater than the corresponding background model image times a threshold scaling value of between 0 and 1, the output value will be a binary 1, thus denoting the presence of the user's hand 24. In this manner, the scaling value can be selected to provide an optimal balance between desirably detecting the user's hand 24 while being substantially insensitive to residual variations in illumination intensity from the top-surface of the vertical display surface 20. As a result, edges associated with the user's hand 24 can be detected in each of the images.

The contrast enhanced binarized silhouette images of the user's hand 24 are then each input to an object detection algorithm device 56. The object detection algorithm device 56 can be an integrated circuit (IC) or set of ICs within the gesture recognition interface controller 50, or could be a software routine residing in the gesture recognition interface controller 50. The object detection algorithm device 56 can include any of a variety of detection algorithms for determining a two-dimensional location of the user's hand 24 relative to the vertical display surface 20. As an example, the object detection algorithm device 56 can include a two-dimensional convolution filter, such as a Laplacian of Gaussian convolution filter, that applies a mathematical algorithm to each of the digitized images of the user's hand 24 to determine the location of one or more features of the user's hand 24, such as fingertips, in two-dimensional space, as described in U.S. patent application Ser. No. 11/485,788. As another example, the object detection algorithm device 56 can generate a sequence of mid-points that are symmetrically disposed between edges along elongated portions of the user's hand 24 to form a skeletal representation of the user's hand 24, as described in U.S. patent application Ser. No. 12/133,836. Accordingly, features associated with the user's hand 24 that can be determinative of input gestures can be detected in each of the silhouette images of the user's hand 24.

The output data of the object detection algorithm device 56, such as a convolution filtered image or a skeletal representation image, is provided to a calibration data and location resolver 58. The calibration data and location resolver 58 determines a three-dimensional location of the features associated with the user's hand 24 at a given time. As an example, the calibration data and location resolver 58 can be configured to determine a parallax separation between end-points that are determined, for example, by a peak detector from convolution filtered images provided from each of the cameras 12 and 14. As another example, the calibration data and location resolver 58 can be configured to compare the relative two-dimensional locations of the corresponding points in each of the skeletal representation images of the user's hand 24 and to interpolate a three-dimensional location of the points based on a parallax separation of the corresponding points. Accordingly, the calibration data and location resolver 58 can determine the three-dimensional location of the one or more features associated with the user's hand 24 relative to the vertical display surface 20 for each matched pair of images provided by the cameras 12 and 14.

The data output from the calibration data and location resolver 58 is input to a gesture recognition device 60. The gesture recognition device 60 interprets the three-dimensional feature data associated with the user's hand 24 and translates changes in the location data into an input gesture. In the example of FIG. 2, the gesture recognition device 60 includes an image buffer 62. The image buffer 62 can be configured to store sequential sets of the three-dimensional location data that each correspond to a matched pair of images provided from the first and second cameras 12 and 14. Therefore, the gesture recognition device 60 can thus be configured to analyze patterns and/or changes associated with the sequential sets of the three-dimensional feature data to determine an input gesture provided by the user's hand 24.

The gesture recognition interface controller 50 also includes a gesture library 64 coupled to the gesture recognition device 60. The gesture library 64 could include a plurality of predefined gestures, with each of the predefined gestures corresponding to a particular device input. For example, the gesture library 64 could include a database of specific arrangements and combinations of fingertip positions and sequential motions that each correspond to a different computer input. Examples of the predefined input gestures are described in greater detail below in the examples of FIGS. 5-8.

The gesture recognition device 60, upon analyzing the sequential sets of the three-dimensional feature data in the image buffer 62, could poll the gesture library 64 to determine if the gesture input matches a predefined gesture. Upon determining a match, the gesture recognition device 60 could translate the gesture input into the device input that corresponds to the predefined gesture. The gesture library 64 could be pre-programmed with the appropriate predefined gesture inputs, or it could be dynamically programmable, such that new gestures can be added, along with the corresponding device inputs. For example, a user could activate a "begin gesture sample" operation, perform the new gesture, capture the appropriate images of the new gesture using the first camera 12 and the second camera 14, and input the appropriate device input for which the new gesture corresponds.

It is to be understood that a given gesture recognition interface system is not intended to be limited by the example of FIG. 2. Other implementations are possible for providing inputs in accordance with an aspect of the invention. For example, one or more of the devices in the gesture recognition interface controller 50 could be integral with other devices, or could be separate from the gesture recognition interface controller 50. For example, the cameras 12 and 14 could each input their respective images to a common digitizer 52. Accordingly, the gesture recognition interface controller 50 can be configured in any of a variety of ways.

Figure 3:
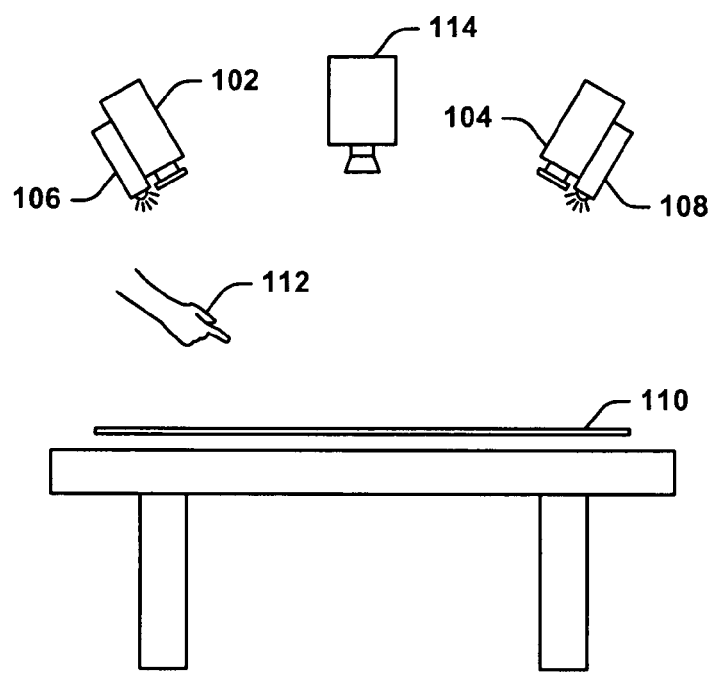
FIG. 3 illustrates another example of a gesture recognition interface system in accordance with an aspect of the invention.

FIG. 3 illustrates another example of a gesture recognition interface system 100 in accordance with an aspect of the invention. The gesture recognition interface system 100 can be another type example of a gesture recognition interface system in which hand-gesture inputs can be determined and translated into device inputs, similar to as described above in the example of FIG. 1.

The gesture recognition interface system 100 includes a first camera 102 and a second camera 104. Coupled to each of the first camera 102 and the second camera 104, respectively, is a first IR light source 106 and a second IR light source 108. The first camera 102 and the second camera 104 may each include an IR filter, such that the respective camera may pass IR light and substantially filter other light spectrums. The first IR light source 106 and the second IR light source 108 each illuminate a horizontal background surface 110 which can be retroreflective. As such, IR light from the first IR light source 106 can be reflected substantially directly back to the first camera 102 and IR light from the second IR light source 108 can be reflected substantially directly back to the second camera 104. Accordingly, an object that is placed above the background surface 110 may reflect a significantly lesser amount of IR light back to each of the first camera 102 and the second camera 104, respectively. Therefore, such an object can appear to each of the first camera 102 and the second camera 104 as a silhouette image, such that it can appear as a substantially darker object in the foreground of a highly illuminated background surface 110. It is to be understood that the background surface 110 may not be completely retroreflective, but may include a Lambertian factor to facilitate viewing by users at various angles relative to the background surface 110.

A user's bare hand 112 can provide simulated inputs over the background surface 110. In the example of FIG. 3, the first camera 102 and the second camera 104 each receive separate silhouette images of the user's hand 112, where each of the separate silhouette images received, respectively, by the first camera 102 and the second camera 104 are a matched pair, similar to as described above in the example of FIG. 1. The user's hand 112 can appear to be in a different location relative to the retroreflective screen in each silhouette image matched pair captured by each of the first camera 102 and the second camera 104, respectively, due to parallax caused by the different mounted locations of each of the first camera 102 and the second camera 104.

The first camera 102 and the second camera 104 can each provide their respective separate silhouette images of the user's hand 112 to a controller (not shown), similar to as described above in the example of FIG. 1. The controller can process the respective silhouette images associated with the user's hand 112 to generate three-dimensional feature data associated with the user's hand 112. For example, each of the first camera 102 and the second camera 104 could be mounted at a predetermined angle relative to the background surface 110. For a given matched pair of images of the user's hand 112, if the predetermined angle of each of the cameras 102 and 104 is equal, then each point of the user's hand 112 in two-dimensional space in a given image from the camera 102 is equidistant from a corresponding point of the user's hand 112 in the respective matched image from the camera 104. As such, using a computer algorithm, the controller could determine the three-dimensional physical location of at least one feature associated with the user's hand 112.

The gesture recognition interface system 100 can also include a projector 114 configured to project image data. The projector 114 can provide an output interface, such as, for example, computer monitor data, for which the user can interact and provide inputs using the user's hand 112. In the example of FIG. 3, the projector 114 can project the image data onto the background surface 110. Because the IR light sources 106 and 108 do not illuminate visible light, the IR illumination does not interfere with the image data projected from the projector 114. The user can thus employ the user's hand 112 directly onto the image data to simulate inputs, such as, for example, mouse inputs.

It is to be understood that the gesture recognition interface system 100 is not intended to be limited to the example of FIG. 3. As an example, instead of the IR light sources 106 and 108, the projector 114 can include an IR filter as one of the colors on an associated color wheel, such as for a digital light projection (DLP) type projector. As another example, instead of the background surface 110 being retroreflective, the background surface 110 could instead be light diffusive, such that the IR light sources 106 and 108 are configured beneath the background surface 110. As a result, the first and second cameras 102 and 104 detect the IR brightness contrast as shadows of the user's hand 112 relative to the IR diffuse background surface 110. Accordingly, the gesture recognition interface system 100 can be configured in any of a variety of ways.

Figure 4:
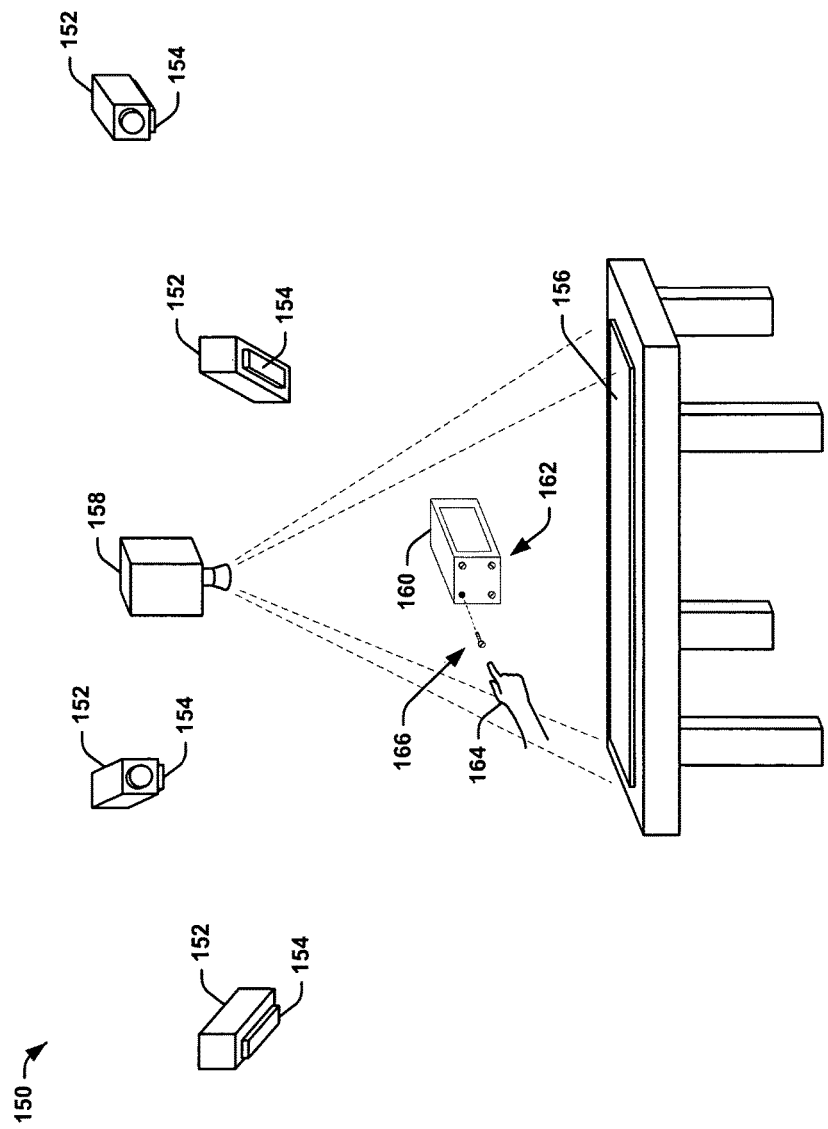
FIG. 4 illustrates an example of a gesture recognition simulation system in accordance with an aspect of the invention.

FIG. 4 illustrates an example of a gesture recognition simulation system 150 in accordance with an aspect of the invention. The gesture recognition simulation system 150 includes four cameras 152, each of which includes a respective IR light source 154. The cameras 152 may each include an IR filter, such that each of the respective cameras 152 may only be able to receive IR light. The IR light sources 154 each illuminate a retroreflective surface 156, such that IR light from the IR light sources 154 is reflected substantially directly back to the respective one of the cameras 152.

The gesture recognition simulation system 150 includes a three-dimensional display system 158, demonstrated in the example of FIG. 4 as a holograph projector. In the example of FIG. 4, the three-dimensional display system 158 projects a holographic image of a simulated object 160. The three-dimensional display system 158 is demonstrated in the example of FIG. 4 as being mounted directly above the retroreflective surface 156. Accordingly, a user can provide gesture inputs, such as described in the examples of FIGS. 5-8 below, to interact directly with the holographic image of the simulated object 160. In addition, the holographic image of the simulated object 160 can include a plurality of functional components 162, demonstrated in the example of FIG. 4 as screws attached to an end of the simulated object 160.

A user's hand 164 can be used to provide hand-gesture inputs over the retroreflective surface 156. To provide the interaction between the user's hand 164 and the given functional component 162, an associated controller (not shown) can detect a three-dimensional physical location of one or more features of the user's hand 164, such as described above in the example of FIG. 2. Upon determining a correlation of the physical locations of the user's hand 164 and a given functional component 162, the controller can determine a gesture motion associated with the user's hand 164 to determine if it corresponds with a predefined action associated with the functional component. Upon determining that the input gesture corresponds with the predefined action, the simulation application controller can command the three-dimensional display system 158 to output the appropriate simulated action.

As an example, a user of the gesture recognition simulation system 150 could perform a reference sub-gesture with the user's hand 164 to refer to one of the functional components 162, demonstrated in the example of FIG. 4 as a screw 166. For example, the controller can translate the reference sub-gesture into a reference that refers to the screw 166, such as by changing its color as displayed by the three-dimensional display system 158. The user could then perform an execution sub-gesture to execute a command associated with unscrewing the screw 166. Thus, as the user provides the appropriate execution sub-gesture, the controller commands the three-dimensional display system 158 to output the appropriate simulated action, which in the example of FIG. 4, is the screw 166 being unscrewed and removed from the simulated object 160.

The gesture recognition simulation system 150 is demonstrated as yet another example of the use of hand-gesture inputs in providing device inputs to a computer. It is to be understood that the gesture recognition simulation system 150 is not intended to be limited to the example of FIG. 4. As an example, the three-dimensional display system 158 can be configured in a variety of different ways, such as a three-dimensional display screen. As another example, the cameras 152 and IR light sources 154 can be arranged in any of a variety of ways and numbers for the controller to determine the hand-gesture inputs that are performed by the user. Accordingly, the gesture recognition simulation system 150 can be configured in any of a variety of ways.

The examples of FIGS. 5-8 demonstrate examples of hand gestures that can be implemented by a user to provide hand-gesture inputs, and thus corresponding device inputs, in a gesture recognition interface system in accordance with an aspect of the invention. As an example, the hand gestures in the examples of FIGS. 5-8 can each be implemented in the gesture recognition interface systems 10 and 100 in the examples of FIGS. 1 and 3, or the gesture recognition simulation system 150 in the example of FIG. 4. In the following discussion of the examples of FIGS. 5-8, reference is to be made to the example of FIG. 1. As such, each of the hand gestures in the examples of FIGS. 5-8 includes the user's hand 24, demonstrated in the examples of FIGS. 5-8 as the right hand of the user. However, it is to be understood that either of the user's hands could be used to perform the single-hand gestures of the examples of FIGS. 5-8. Furthermore, some of the hand gestures in the examples of FIGS. 5-8 demonstrate a gesture performed with both the user's hand 24 and the user's other hand 25 (i.e., the left hand).

Figure 5:
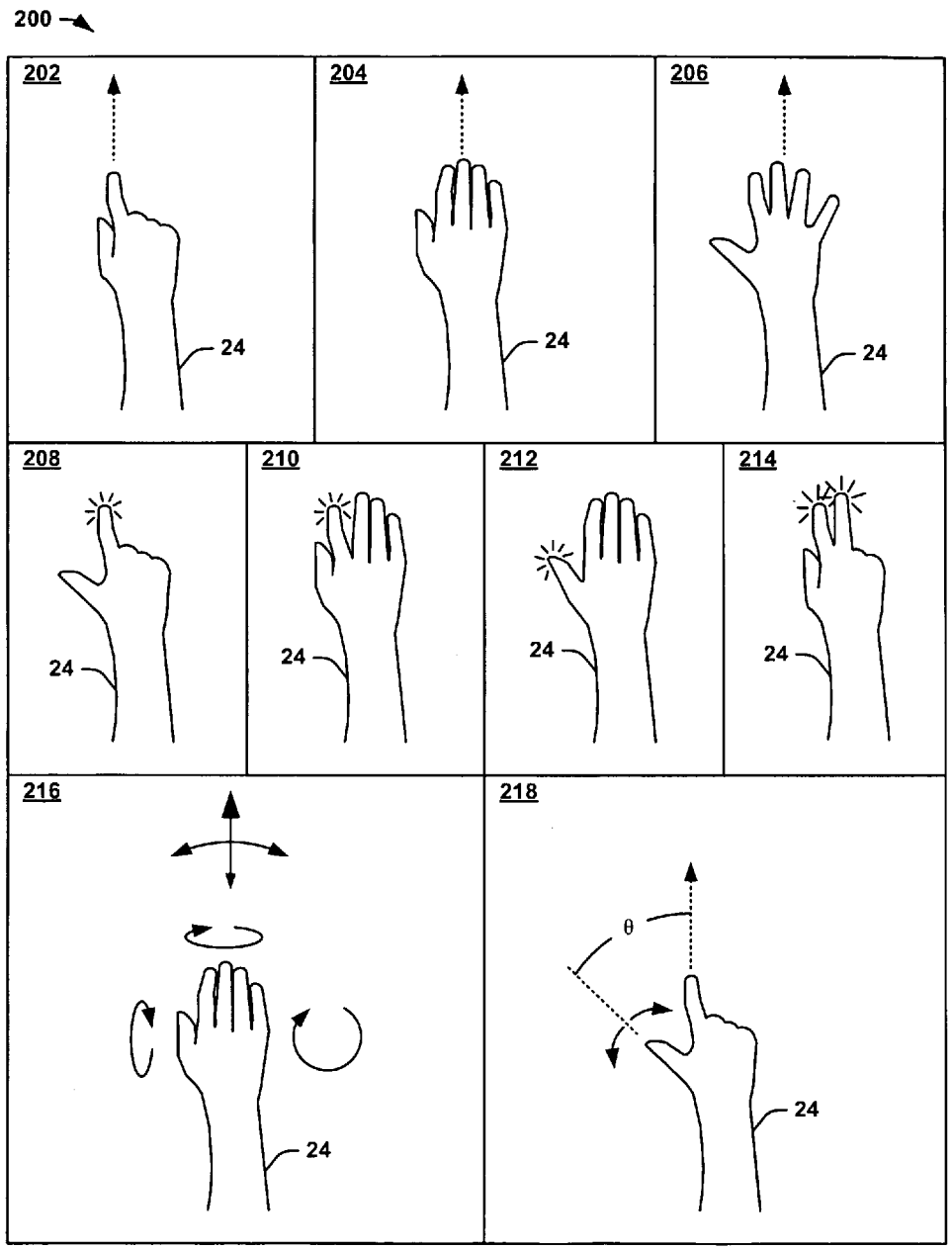
FIG. 5 illustrates an example of hand gestures for use in a gesture recognition interface system in accordance with an aspect of the invention.

FIG. 5 illustrates an example of hand gestures 200 for use in a gesture recognition interface system in accordance with an aspect of the invention. The hand gestures 200 include a gesture 202 in which the user's hand 24 is pointing with an extended finger, demonstrated in the example of FIG. 5 as the extended index finger. As an example, the gesture 202 could be implemented to point to a portion of displayed visual content that is displayed on the vertical display surface 20, or could be implemented to point to a portion of a background surface that does not display the visual content, but corresponds to it in location. In response to the gesture 202, the controller 26 can be configured to provide a visual reference on the corresponding portion of the displayed visual content. As an example, the controller 26 could provide specific and/or concise reference on the visual content, such as a mouse pointer or simulated laser pointer, in response to the gesture 202.

The hand gestures 200 also include gestures 204 and 206 in which the user's hand 24 is demonstrated as a flat, open hand. Specifically, the gesture 204 demonstrates the flat, open hand with all fingers extended and joined together and the thumb retracted alongside the hand 24, and the gesture 206 demonstrates the flat, open hand with all fingers and the thumb extended and separated. As an example, each of the gestures 204 and 206 can also be implemented to point to portions of displayed visual content or portions of the background surface corresponding to the displayed visual content. Similar to the gesture 202, the controller 26 can be configured to provide a visual reference on the corresponding portion of the displayed visual content in response to the gestures 204 and 206. As an example, the controller 26 could provide less specific reference on the visual content, such as to switch a focus between two open windows on the displayed visual content, or to display a translucent "spot-light" image on the displayed visual content, in response to either of the gestures 204 and 206.

The hand gestures 200 also include gestures 208, 210, 212, and 214 that involve contact of the user's hand 24 with the background surface or display surface. Each of the gestures 208, 210, 212, and 214 demonstrate contact with the background surface or display surface with either a single digit while other, non-contacting digits are extended or with multiple digits. Specifically, the gesture 208 demonstrates contact with the extended index finger with the non-contacting thumb also extended and the gesture 210 demonstrates contact with the index finger with the all other non-contacting fingers and the thumb also extended. In addition, the gesture 212 demonstrates contact with the extended thumb with all non-contacting fingers also extended and the gesture 214 demonstrates contact with the extended index and middle fingers with the rest of the fingers and thumb retracted. As an example, the controller 26 can provide a left mouse-click input in response to contact of a single extended finger with the background surface or display surface, such as resulting from contacting the visual content while maintaining the gesture 202. However, the controller 26 can provide other interactive device inputs or other mouse-click inputs in response to one or more of the gestures 208, 210, 212, and 214. For example, the gesture 208 can correspond to a right mouse-click input or selective erasing of visual data on a virtual dry-erase board. As another example, the gestures 210, 212, and/or 214 can each have other associated device inputs corresponding to the portion of the visual content that is contacted by the user's hand 24, such as a middle mouse-button click or assigning other distinct actions or meanings.

The hand gestures 200 also include a gesture 216 in which the user's hand 24 is demonstrated as a flat, open hand. In the example of FIG. 5, the user's hand 24 is demonstrated with the fingers together, but could instead be implemented with the fingers spread. As an example, the gesture 216 can be implemented as an execution sub-gesture of a compound gesture, such as described in U.S. patent application Ser. No. 12/196,767. For example, a portion of the visual content can be selected for interaction, such as by a preceding device input or a preceding gesture input. The gesture 216 can thus include motion in six-degrees of freedom while maintaining the flat, open hand, such that the user's hand 24 can be moved in the X, Y, and Z directions, as well as rotated in the yaw, pitch, and roll axes. Therefore, the controller 26 can provide a device input for motion in six-degrees of freedom of the selected portion of the visual content corresponding to the motion of the flat, open hand gesture. In addition, the user can also move the hand 24 upward or downward while maintaining the flat, open hand position of the hand 24, such as to change a placement, point-of-view, and/or elevation of a camera over a three-dimensional terrain in the displayed visual content.

The hand gestures 200 further include a gesture 218 in which the user's hand 24 is demonstrated as having an extended index finger and an extended thumb. As an example, similar to the gesture 202, the extended index finger in the gesture 218 could point to a portion of displayed visual content or the background surface. The gesture 218 can also include the user moving the thumb in a further extending or further retracting position, such that the user changes the angle θ between the extended index finger and thumb. The changing of the angle θ could correspond to a zoom command, such that the controller 26 is configured to change a zoom associated with the selected portion of the visual content. For example, the user could increase the angle θ to zoom-out to make the selected portion of the visual content smaller and could decrease the angle θ to zoom-in to make the selected portion of the visual content larger, or vice-versa.

Figure 6:
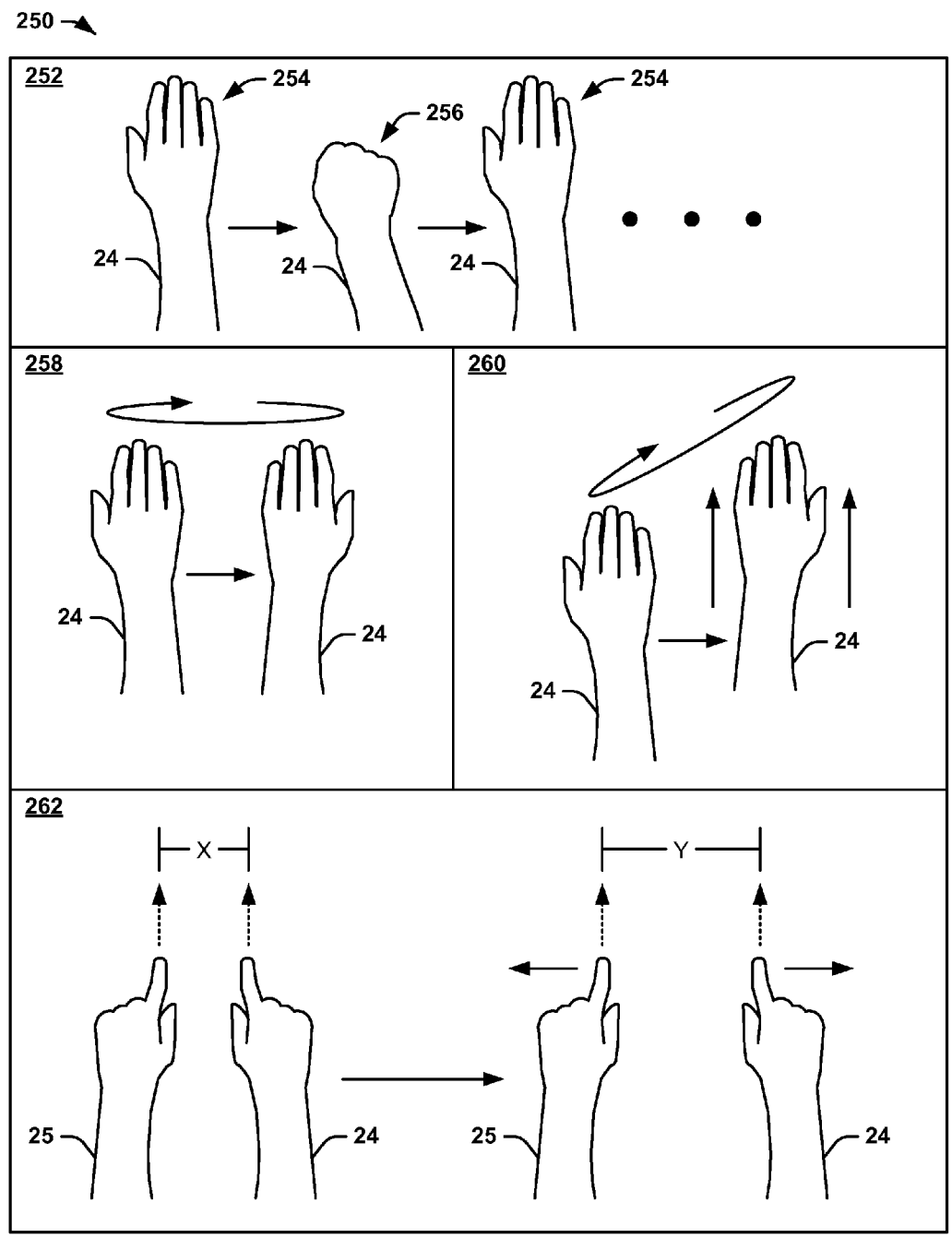
FIG. 6 illustrates another example of hand gestures for use in a gesture recognition interface system in accordance with an aspect of the invention.

FIG. 6 illustrates another example of hand gestures 250 for use in a gesture recognition interface system in accordance with an aspect of the invention. The hand gestures 250 include a gesture 252 in which the user's hand 24 alternates between a first gesture position 254 and a second gesture position 256. Specifically, the first gesture position 254 is demonstrated as a flat, open hand with all fingers extended and joined together and the thumb retracted alongside the hand 24. The second gesture position 256 is demonstrated as a closed-fist. The user can thus alternate from the first gesture position 254 to the second gesture position 256 back to the first gesture position 254 at least once. In response, the controller 26 can be configured to toggle between a list of menu items on an application in the visual content for every alternation between the first and second gesture positions 254 and 256. For example, the controller 26 can be configured to toggle between pen colors in a virtual dry-erase board application. Therefore, the controller 26 can select a different color every time the user's hand 24 is positioned in the second gesture position 256. It is to be understood that the gesture 252 is not limited to the manner demonstrated in the example of FIG. 6, but that the first and second gesture positions 254 and 256 can be switched, such that the gesture 252 begins with the second gesture position 256.

The hand gestures 250 also include gestures 258 and 260 in which the user's hand 24 begins positioned in the flat, open hand with all fingers extended and joined together and the thumb retracted alongside the hand 24. While maintaining the user's hand 24 in the flat, open hand position, the user then rotates the wrist approximately 180 degrees. The gesture 258 could also include a slight lateral motion of the user's hand 24 during the rotation, such as to simulate a stationary hinge on one side of the user's hand 24. In response to the gesture 258, the controller 26 can be configured to page-up or page-down in a selected document in the visual content, such that the gesture 258 intuitively simulates the turning of a page in a book. Therefore, the orientation of the palm of the user's hand 24, as well as the direction of rotation, can be indicative of whether the user is paging forward or paging backward. The gesture 260 is demonstrated as substantially the same as the gesture 258, except that the gesture 260 also includes a forward motion of the user's hand 24, such that the gesture 260 can be an alternative to the gesture 258 or can result in a similar function. As an example, the gesture 260 can correspond to the paging forward or backward by multiple pages instead of one page in the document.

In addition, the gestures 258 and 260 can also include subsequent gestures that can provide different device inputs via the controller 26. For example, upon implementing either of the gestures 258 or 260, the user's hand 24 could be maintained in the flat, open hand position and moved upward or downward to correspond to a slow scrolling of the document in the visual content. As another example, while substantially maintaining the flat, open hand position of the user's hand 24, the user can implement another gesture with the user's hand 24 or with the opposing hand 25 (not shown in the gestures 258 and 260), to page-up or page-down in the document again. For example, upon implementing the gesture 258 or 260, the user could flick the index finger, extend and retract the thumb, or perform a gesture with his or her other hand to repeat the page-up or page-down device input of the gesture 258 or the gesture 260. As yet a further example, the user could extend two or three fingers of the opposing hand 25 for a duration of time while substantially maintaining the flat, open hand position of the user's hand 24. As such, the controller 26 can be configured to initiate auto-turning of pages of the document while substantially maintaining the flat, open hand position of the user's hand 24, such that an acceleration and deceleration of the auto-turning can be controlled proportional to the duration of extension of the two or three fingers of the opposing hand 25.

The hand gestures 250 also include a gesture 262 that includes both of the user's hands 24 and 25. In the gesture 262, the user's hands 24 and 25 are each positioned with the index finger extended and pointing to the background surface and/or visual content. The index fingers could be in contact with the background surface and/or visual content or could be in free space in the foreground of the background surface and/or visual content. The ends of the index fingers are demonstrated at a distance "X" apart from each other at the beginning of the gesture 262. The user could then move the hands 24 and 25 laterally relative to each other to change the distance from "X" to "Y". In the example of FIG. 6, the gesture 262 demonstrates movement of the index fingers further apart, but it is to be understood that the movement could also be closer together. In response, the controller 26 can be configured to zoom the visual content, such as a selected portion of the visual content or the entire visual content. As an example, the endpoints of the index fingers can correspond to reference points on the visual content, such that the movement of the endpoints relative to each other likewise proportionally moves the reference points on the visual content relative to each other to zoom the visual content by the proportional amount (i.e., by a ratio of X/Y or Y/X).

Figure 7:
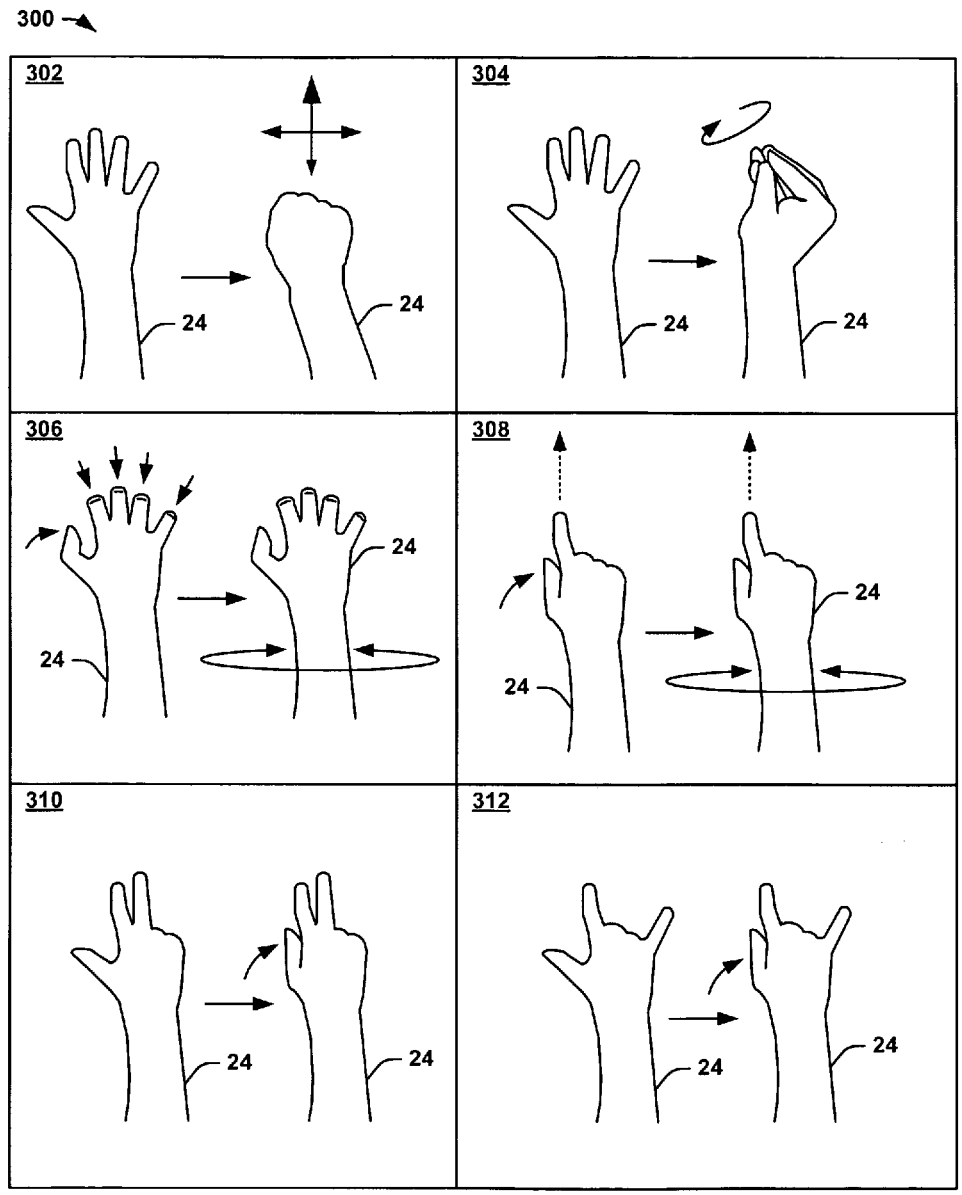
FIG. 7 illustrates yet another example of hand gestures for use in a gesture recognition interface system in accordance with an aspect of the invention.

FIG. 7 illustrates yet another example of hand gestures 300 for use in a gesture recognition interface system in accordance with an aspect of the invention. The hand gestures 300 include gestures 302, 304, and 308 in which the user's hand 24 switches from a substantially flat, open hand gesture to a closed hand gesture. Specifically, in the gesture 302, the user's hand 24 switches from the flat, open hand gesture to a closed-fist. In the gesture 304, the user's hand 24 switches from the flat, open hand gesture to a grip in which the thumb is in contact with the distal ends of one or more fingers, demonstrated in the example of FIG. 7 as all of the fingers. In the gesture 306, the user's hand 24 switches from the flat, open hand gesture to a claw-like grip, in which all of the fingers and the thumb of the user's hand 24 are bent at a knuckle that is not the most proximal to the hand 24 itself. Each of the gestures 302, 304, and 306 can correspond to "grasping" a portion of the visual content. As an example, the user's hand 24 can touch the background surface and/or visual content corresponding to the portion of the visual content to be grasped, such that the gestures 302, 304, and 306 correspond to selection of the portion of visual content for further interaction.

As an example, in the gesture 302, the user's hand 24 can be moved in the X, Y, and/or Z direction while maintaining the closed-fist. In response, the controller 26 can be configured to move the corresponding portion of the visual content in the corresponding X, Y, and/or Z direction. As another example, in the gestures 304 and 306, the user's hand 24 can be rotated based on a rotation at the wrist while maintaining the thumb and finger contact of the gesture 304 or the claw-like grip of the gesture 306. In response, the controller 26 can be configured to rotate the corresponding portion of the visual content in the direction of rotation of the user's hand 24. In addition, in the gestures 302, 304, and 306, the user's hand 24 could be both moved and rotated, such that the controller could likewise both move and rotate the corresponding portion of the visual content.

The hand gestures 300 also include a gesture 308 in which the user's hand 24 is positioned with both an extended index finger and an extended thumb and a gesture 310 in which the user's hand 24 is positioned with an extended index finger, an extended middle finger, and an extended thumb. As an example, the gestures 308 and 310 could be implemented to point the extended index finger in the gesture 308 or both extended fingers in the gesture 310 to a portion of background surface and/or visual content. The user can then retract the thumb to initiate a tilt and/or pan command of the corresponding portion of the visual content to which the extended finger or fingers point. Therefore, the portion of the visual content can be tilted and/or panned based on rotation of the wrist and/or orientation of the index finger as long as the thumb remains retracted. Accordingly, the gestures 308 and 310 can be compound gestures, such as to include a reference sub-gesture (i.e., the pointing of the finger(s) to refer to the portion of the visual content) and an execution sub-gesture (i.e., the retraction of the thumb to initiate the pan and/or tilt).

The hand gestures 300 also include a gesture 312 in which the user's hand 24 is positioned with an extended index finger, an extended little finger, and an extended thumb. As an example, the extended fingers can refer to a portion of the visual content, such as a menu or document. The user can then retract the thumb to initiate a speed scrolling command of the corresponding portion of the visual content, such as similar to depressing the scroll wheel of a mouse. The speed scrolling can be initiated in a specific direction (e.g., forward) without additional motion of the user's hand 24, or can be direction specific based on motion of the hand 24 upward or downward. As an example, the speed scrolling can continue until the user extends the thumb again. Therefore, similar to as described above with respect to the gesture 310, the gesture 312 can be a compound gesture.

Figure 8:
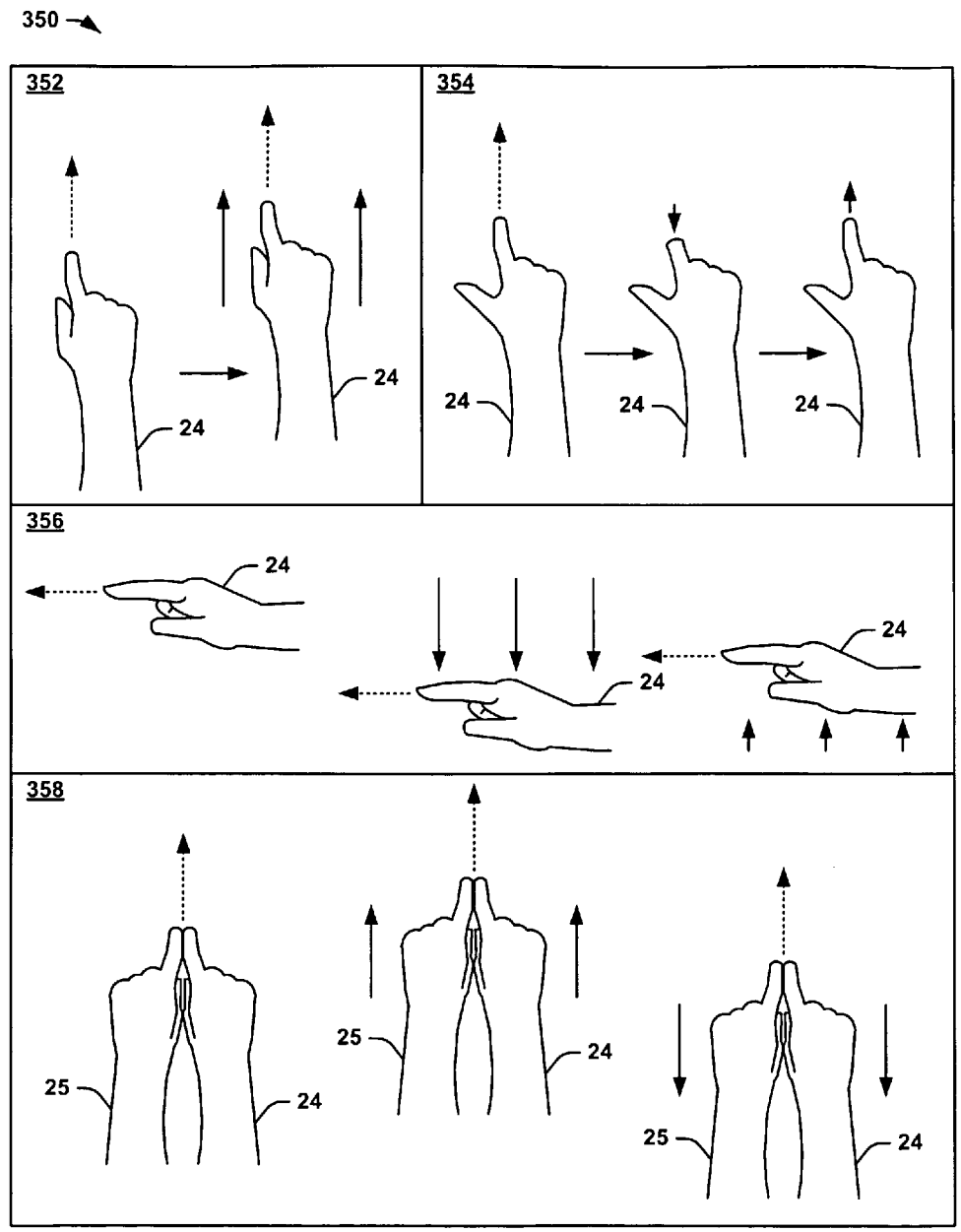
FIG. 8 illustrates yet a further example of hand gestures for use in a gesture recognition interface system in accordance with an aspect of the invention.

FIG. 8 illustrates yet a further example of hand gestures 350 for use in a gesture recognition interface system in accordance with an aspect of the invention. In the example of FIG. 8, the hand gestures 350 are all compound gestures that include both a reference sub-gesture and an execution sub-gesture. The hand gestures 350 include a gesture 352 in which the user's hand 24 is positioned such that an extended index finger can point to a portion of the visual content as a reference sub-gesture. The gesture 352 also includes an execution sub-gesture in which the user's hand 24 is moved forward toward the portion of the visual content. As an example, the portion of the visual content can be a menu tab or option list. Thus, in response to the motion of the hand 24 toward the portion of the visual content, the controller 26 can be configured to open (i.e., "pull down") the menu or expand the option list, such as to reveal more options in the menu or option list.

The hand gestures 350 include a gesture 354 in which the user's hand 24 is positioned such that an extended index finger can point to a portion of the visual content as a reference sub-gesture. The gesture 354 also demonstrates that the thumb is likewise extended, although it could also be retracted. As an example, the portion of the visual content can be an Internet browser window. The gesture 354 also includes an execution sub-gesture in which the index finger of the user's hand 24 is "triggered", such that it is rapidly bent at a distal knuckle and re-extended. In response to the triggering of the index finger, the controller 26 can be configured to return the Internet browser to an immediately preceding webpage, such as similar to clicking on a "Back" button of a given Internet browser. The gesture 354 can also include other components, such as a triggering (e.g., rapid retraction and re-extension) of the thumb being equivalent to a "Forward" button, or any of a variety of other gesture options.

The hand gestures 350 include gestures 356 and 358. The gesture 356 is demonstrated with the user's hand 24 while the gesture 358 is demonstrated as incorporating both of the user's hands 24 and 25. The gestures 356 and 358 each include a reference sub-gesture, demonstrated with the gesture 356 as a pointing of the index finger toward a portion of the visual content and demonstrated with the gesture 358 as the index finger of each of the user's hands 24 and 25 longitudinally joined together and pointing to a portion of the visual content. As an example, the user's hands 24 and 25 can also be held together, such as palm-to-palm, and could include interlocking of the remaining fingers.

The gestures 356 and 358 also each include an execution sub-gesture. The execution sub-gesture of the gesture 356 is demonstrated as a sudden drop of the user's hand 24 in the downward direction, followed by a slight upward motion, all while maintaining the extension of the index finger. The execution sub-gesture of the gesture 358 is demonstrated as a rapid jabbing motion with both of the user's hands 24 while maintaining the joining and pointing of the index fingers, such that the hands 24 and 25 are rapidly moved forward then backward. As an example, the execution sub-gestures of each of the gestures 356 and 358 can correspond to selection of the portion of the visual content for further interaction. As another example, the execution sub-gesture of the gesture 356 can correspond to movement of an entity in a computer assisted drawing (CAD) application, such as in the direction of the reference sub-gesture, or can correspond to sending a selected video feed to another display to which the index finger points.

The hand gestures 200, 250, 300, and 350 are not intended to be limited to the examples of FIGS. 5-8. Specifically, the hand gestures 200, 250, 300, and 350 are merely examples of gestures that can be implemented in the gesture recognition interface system 10, and are not intended to be an exhaustive list. In addition, the hand gestures 200, 250, 300, and 350 are not intended to be limited to the described corresponding device inputs. Therefore, any of a variety of additional gestures, variations of the hand gestures 200, 250, 300, and 350, and corresponding device inputs can be implemented in the gesture recognition interface system 10.

Figure 9:
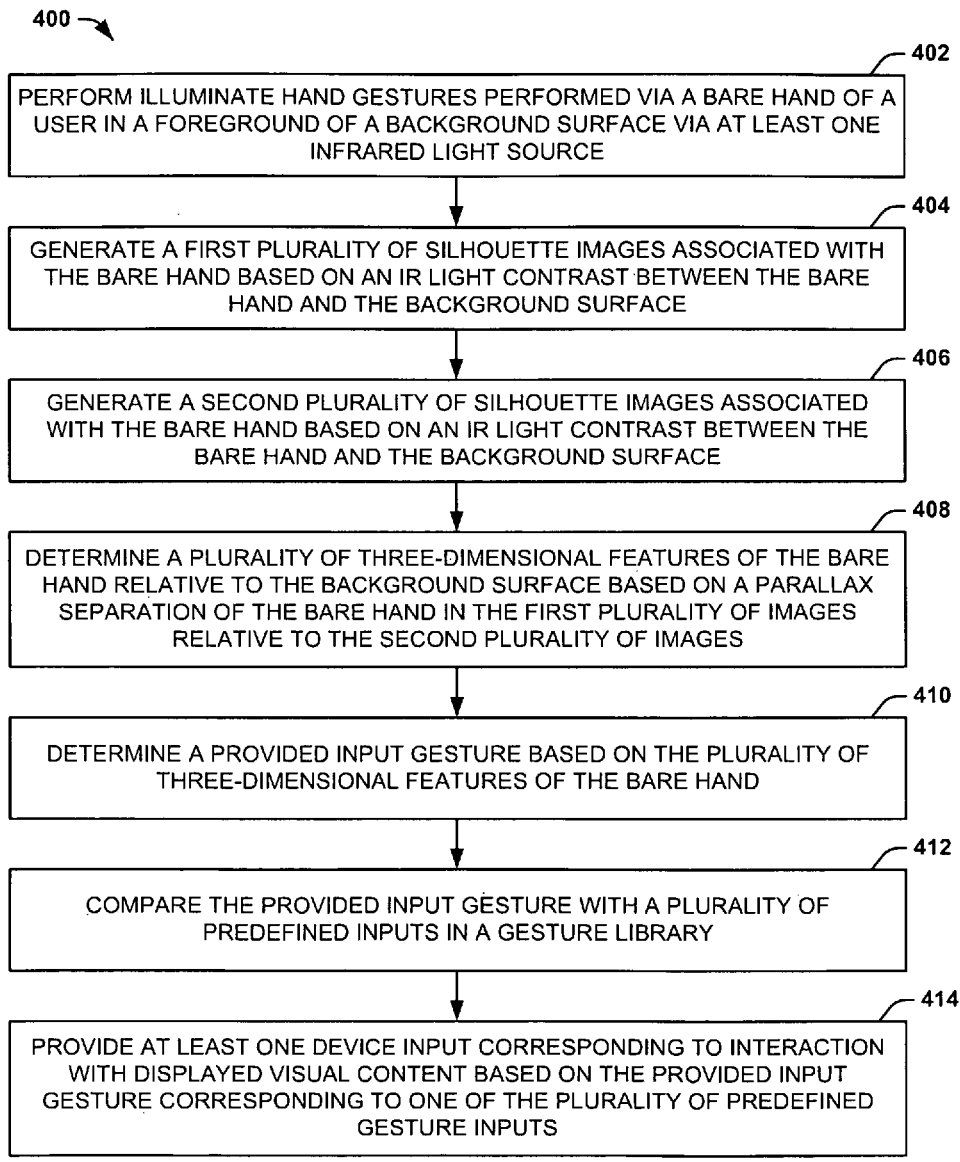
FIG. 9 illustrates an example of a method for providing device inputs in accordance with an aspect of the invention.

In view of the foregoing structural and functional features described above, a methodology in accordance with various aspects of the present invention will be better appreciated with reference to FIG. 9. While, for purposes of simplicity of explanation, the methodologies of FIG. 9 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 9 illustrates an example of a method 400 for providing device inputs in accordance with an aspect of the invention. At 402, hand gestures performed via a bare hand of a user in a foreground of a background surface are illuminated with at least one infrared (IR) light source. The bare hand could be the user's hand unadorned with sensors or gloves suited especially for gesture recognition. The bare hand could include both hands of the user. The hand gestures could be any of a variety of gestures intended to provide a device input to a gesture recognition interface system. The background surface can be a retroreflective screen, the floor beneath a vertical display screen, or an IR diffusive screen. At 404, a first plurality of silhouette images associated with the bare hand are generated based on an IR light contrast between the bare hand and the background surface. At 406, a second plurality of silhouette images associated with the bare hand are generated based on an IR light contrast between the bare hand and the background surface. The silhouette images can be based on bright IR light that is reflected or emitted from the background surface, or can be based on reflected IR light from the hand in contrast to a dark background. The images can be obtained from at least one camera, such as two stereo cameras that obtain the first and second pluralities of images, respectively. The time-divided images could be obtained from a single camera, such that the first and second silhouette images are based on alternating strobes of a first and second IR light source.

At 408, a plurality of three-dimensional features of the bare hand are determined relative to the background surface based on a parallax separation of the bare hand in the first plurality of silhouette images relative to the second plurality of silhouette images. The first and second pluralities of images can form matched sets of images that demonstrate the bare hand having a relative parallax separation that is determinative of the three-dimensional features. The three-dimensional features can include location, pitch and/or orientation of the hand, fingers, and fingertips. At 410, a provided input gesture is determined based on the plurality of three-dimensional features of the bare hand. The matched sets of images can be buffered, such that sequential images can be determinative of motion of the hand.

At 412, the provided input gesture is compared with a plurality of predefined gesture inputs in a gesture library. The gesture library can be a memory having the predefined gestures. The predefined gestures can each correspond to a specific device input. The predefined gestures can correspond to any of the hand gestures 200, 250, 300, and 350 in the example of FIGS. 5-8. At 414, at least one device input corresponding to interaction with displayed visual content is provided based on the provided input gesture corresponding to one of the plurality of predefined gesture inputs. The device input can be a computer input that interacts with the visual content. The input gesture can be a compound gesture, such that a sub-gesture refers to a portion of the visual content and an execution sub-gesture performs a function on the referenced portion of the visual content.

What have been described above are examples of the present invention. It is, of course, not possible to describe every conceivable combination of components or methodologies for purposes of describing the present invention, but one of ordinary skill in the art will recognize that many further combinations and permutations of the present inven-

What is claimed is:

1. A method or providing device inputs, the method comprising:
illuminating hand gestures performed via a bare hand of a user in a three-dimensional foreground of a background surface with at least one infrared (IR) light source;
generating a first plurality of silhouette images associated with the bare hand based on an IR light contrast between the bare hand and the background surface;
generating a second plurality of silhouette images associated with the bare hand based on an IR light contrast between the bare hand the background surface;
determining a plurality of three-dimensional features of the bare hand relative to the background surface based on a parallax separation of the bare hand in the first plurality of silhouette images relative to the second plurality of silhouette images;
determining a first provided input gesture based on the plurality of three-dimensional features of the bare hand, the provided input gesture comprising the bare hand being positioned in a flat, open hand gesture and being rotated at an associated wrist approximately 180 degrees;
determining a second provided input gesture comprising the flat, open hand gesture being maintained subsequent to rotation of the associated wrist while at least one additional gesture input is performed from one of the bare hand and another bare hand of the user;
comparing the provided first and second input gestures with a plurality of predefined gesture inputs in a gesture library;
providing at least one first device input corresponding to interaction with displayed visual content based on the provided first input gesture corresponding to one of the plurality of predefined gesture inputs, the at least one first device input responsive to the provided first input gesture comprising one of a page-up input and a page-down input associated with a document; and
providing at least one second device input corresponding to interaction with the displayed visual content based on the provided second input gesture corresponding to one of the plurality of predefined gesture inputs, the at least one second device input responsive to the provided second input gesture comprising one of:
scrolling a page of the document one of upwards and downwards in response to the at least one additional gesture input from the bare hand;
repeating at least one of the page-up and the page-down inputs associated with the document in response to the at least one additional gesture input; and
auto-turning a page of the document at one of an acceleration and a deceleration that is based on a duration at which the at least one additional gesture input is maintained.

2. The method of claim 1, wherein determining the provided second input gesture further comprises determining a second input gesture comprising the bare hand being positioned in the flat, open hand gesture and being rotated at the wrist approximately 180 degrees while concurrently moving forward, and wherein providing the at least one device input comprises providing one of a plurality of page-up inputs and a plurality of page down inputs associated with the document responsive to the second input gesture.

3. A method of providing device inputs, the method comprising:
illuminating hand gestures performed via a bare hand of a user in a three-dimensional foreground of a background surface with at least one infrared (IR) light source;
generating a first plurality of silhouette images associated with the bare hand based on an IR light contrast between the bare hand and the background surface;
generating a second plurality of silhouette images associated with the bare hand based on an IR light contrast between the bare hand and the background surface;
determining a plurality of three-dimensional features of the bare hand relative to the background surface based on a parallax separation of the bare hand in the first plurality of silhouette images relative to the second plurality of silhouette images;
determining a provided input gesture based on the plurality of three-dimensional features of the bare hand, the provided input gesture comprising the bare hand switching from a first sub-gesture comprising an extended thumb, and extended index finger, and an extended middle finger to a second sub-gesture comprising a retracted thumb, an extended index finger, and an extended middle finger and is moved one of up, down, left, and right while maintaining the second sub-gesture;
comparing the provided input gesture with a plurality of predefined gesture inputs in a gesture library; and
providing at least one device input corresponding to interaction with displayed visual content based on the provided input gesture corresponding to one of the plurality of predefined gesture inputs, the at least one device input responsive to the provided input gesture comprising tilting a view one of up and down in response to the movement of the maintained second sub-gesture up and down, respectively, and panning the view one of left and right in response to the movement of the maintained second sub-gesture left and right, respectively.

4. A method of providing device inputs, the method comprising:
illuminating hand gestures performed via a bare hand of a user in a three-dimensional foreground of a background surface with at least one infrared (IR) light source;
generating a first plurality of silhouette images associated with the bare hand based on an IR light contrast between the bare hand and the background surface;
generating a second plurality of silhouette images associated with the bare hand based on an IR light contrast between the bare hand and the background surface;
determining a plurality of three-dimensional features of the bare hand relative to the background surface based on a parallax separation of the bare hand in the first plurality of silhouette images relative to the second plurality of silhouette images;
determining a provided input gesture based on the plurality of three-dimensional features of the bare hand, the provided input gesture comprising the bare hand of the user pointing at the portion of the displayed visual content with an extended index finger and an extended thumb that is subsequently retracted followed by a rotation of an associated wrist;

comparing the provided input gesture with a plurality of predefined gesture inputs in a gesture library; and providing at least one device input corresponding to interaction with displayed visual content based on the provided input gesture corresponding to one of the plurality of predefined gesture inputs, the at least one device input responsive to the provided input gesture comprising tilting a view associated with the displayed visual content in response to the retraction of the thumb, the tilting being based on the rotation of the wrist.

\* \* \* \* \*

UNITED STATES PATENT AND TRADEMARK OFFICE
CERTIFICATE OF CORRECTION

| | | |
|---|---|---|
| PATENT NO. | : 9,696,808 B2 | Page 1 of 1 |
| APPLICATION NO. | : 12/337225 | |
| DATED | : July 4, 2017 | |
| INVENTOR(S) | : H. Keith Nishihara et al. | |

It is certified that error appears in the above-identified patent and that said Letters Patent is hereby corrected as shown below:

In the Claims

Column 17, Line 6 reads "method or" should read --method of--

Column 17, Line 17 reads "bare hand the" should read --bare hand and the--

Column 18, Line 25 reads "and extended index" should read --an extended index--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*